United States Patent [19]
Suttan et al.

[11] 3,827,275
[45] Aug. 6, 1974

[54] METHOD OF AND APPARATUS FOR THE UPSETTING OF BARS AND SIMILAR WORKPIECES

[75] Inventors: Franz Suttan; Paul Veit; Oskar Rauber, all of Dusseldorf, Germany

[73] Assignee: Maschinenfabrik Hasenclever GmbH, Dusseldorf, Germany

[22] Filed: Dec. 4, 1972

[21] Appl. No.: 311,741

[30] Foreign Application Priority Data
Dec. 7, 1971  Germany............................ 2160635
Jan. 18, 1972  Germany............................ 2202234
July 1, 1972  Germany............................ 2232584

[52] U.S. Cl................. 72/342, 72/346, 219/10.57, 219/10.79
[51] Int. Cl............................................. B21d 37/16
[58] Field of Search...... 72/318, 342, 346; 219/150, 219/151, 152, 10.57, 10.79; 10/27 H

[56] References Cited
UNITED STATES PATENTS

| | | | |
|---|---|---|---|
| 1,380,250 | 5/1921 | Reymond............................ | 425/217 |
| 2,430,529 | 11/1947 | Mora.................................... | 72/342 |
| 2,495,060 | 1/1950 | Hanna................................... | 72/342 |
| 2,647,979 | 8/1953 | Knight et al. ........................ | 72/342 |
| 2,836,706 | 5/1958 | Cavanagh............................. | 219/150 |
| 2,889,448 | 6/1959 | Hampton.............................. | 219/150 |
| 2,890,324 | 6/1959 | Havlik................................... | 219/151 |
| 3,487,196 | 2/1967 | Bachmann............................ | 219/151 |
| 3,689,969 | 9/1972 | Tsunoda................................ | 29/150 |
| 3,698,219 | 10/1972 | Moore et al. ......................... | 72/38 |
| 3,728,887 | 4/1973 | Bachmann............................ | 72/318 |

*Primary Examiner*—Charles W. Lanham
*Assistant Examiner*—James R. Duzan
*Attorney, Agent, or Firm*—Karl F. Ross; Herbert Dubno

[57] ABSTRACT

A method of and an apparatus for the upset forming of the end of an elongated metal workpiece, such as a bar or rod, wherein an upsetting die or anvil is disposed within an induction-heating coil together with the end of the bar to be deformed. The anvil is thereby heated to a temperature at least equal to the temperature of the bar and the two are brought into axial engagement to deform the heated end of the bar. During deformation the anvil and the deformed end of the bar may be advanced out of the induction coil which preferably has an enlarged conical end to accomodate the head formed on the workpiece and the anvil. The remainder of the induction coil may lie along a cylinder coaxial with the workpiece.

13 Claims, 7 Drawing Figures

METHOD OF AND APPARATUS FOR THE UPSETTING OF BARS AND SIMILAR WORKPIECES

FIELD OF THE INVENTION

The present invention relates to a method of and an apparatus for the upset forming of elongated metallic workpieces and, more particularly, to a method of and an apparatus for the upsetting of an end of a bar or rod which is inductively heated.

BACKGROUND OF THE INVENTION

In the upset forming of a metallic workpiece, generally described as upsetting, an elongated body, generally a bar or rod of a regular cross-section, is heated and pressed axially against a surface, e.g., an anvil or upsetting die, to cause the material in the heated region to spread outward and thereby forming a bulge or head. Where the technique is practiced upon the heated end of a workpiece, it is referred to as heading.

It has been proposed to use electric heating means to raise the desired portion of the bar or workpiece to the upset-forming temperature and the present disclosure is concerned primarily with electric heating arrangements whereby the bar is inductively heated, i.e., where the bar may be surrounded by a coil through which a high frequency alternating current is passed to induce an alternating magnetic field in the bar or workpiece. As is well known from the principles of induction-heating, this high frequency, rapidly alternating magnetic field generally is converted to heat energy within a metallic body traversed by the magnetic field.

In induction-heated upsetting presses for the purposes described, the bar or workpiece is fed through an induction-heating coil and the anvil or upsetting die is disposed ahead of and beyond the induction-heating coil so that the workpiece must travel beyond the coil into engagement with the anvil. The coil is cylindrical and cannot accomodate the head formed at the end of the workpiece so that the deformation step takes place substantially entirely beyond the coil.

This system has been found to have significant disadvantages. Firstly, since the anvil is located at some distance from the coil, the workpiece undergoes uncontrolled cooling in the region between the induction-heating coil and the anvil which has a detrimental effect upon the upsetting process and the uniformity and stress characteristics of the head which is produced. Secondly, since the free end of the workpiece adapted to engage the anvil is most distal from the induction-heating coil upon contact with the anvil, it frequently is chilled to the point where it is incapable of upset (threading) deformation. It is not uncommon, therefore, to find heads produced in upsetting machines of the described type to have short stubs of the original dimension of the workpieces projecting axially from the head. The stub may have a length of 1 to 3 mm which is highly disadvantageous in most applications. It may be mentioned that simple heating of the anvil at its location remote from the coil does not suffice to overcome this difficulty, presumably because of the stretch of uncontrolled cooling and thermal disequilibration between the induction-heating coil and the anvil.

OBJECTS OF THE INVENTION

It is the principal object of the present invention to provide an improved upsetting method and apparatus whereby the aforementioned disadvantages are obviated.

Another object of the invention is to provide an improved upsetting apparatus and method adapted to eliminate the formation of stubs of the above described type and the uncontrolled cooling of the end of the workpiece to be deformed against the anvil.

SUMMARY OF THE INVENTION

These objects and others which will become apparent hereinafter are attained, in accordance with the present invention, with an upsetting machine or apparatus in which the induction-heating device comprises one or more induction-heating coils arrayed along a cylindrical stretch designed to be coaxial to the bar or rod workpiece, and terminating in a frustoconically divergent stretch at its end facing the anvil to accommodate the head formed in the workpiece and the anvil upsetting die. According to an important feature of the invention, therefore, the induction-coil arrangement comprises, at its side turned away from the anvil, a cylindrical portion adapted to surround the the workpiece and, at its end turned toward the anvil, a conical enlargement adapted to accommodate the anvil. According to the invention, moreover, the anvil is provided with a drive means adapted to withdraw the anvil from the conical enlargement of the induction-heating coil during press operation so that, once the head is formed within the induction coil, the head and the anvil may be shifted out of the latter for cooling.

According to another feature of the invention, a drive means is provided for advancing the workpiece and for withdrawing the anvil at differentially determined speeds to ensure upsetting of the heated end of the workpiece within the induction-heating coil.

From the foregoing, it will be apparent that the anvil at the commencement of the upsetting process is located within the induction heating arrangement and that the upsetting of a head on the workpiece begins directly within the induction-heating coil. Consequently, there is no opportunity for uncontrolled cooling or stub formation as described. Upsetting is able to begin at the hottest part of the workpiece and uncontrolled or detrimental quenching of the workpiece against the anvil cannot occur. The anvil is of course heated to the same or a higher temperature than the workpiece. As soon as the anvil is withdrawn from the coil, the head can build to a dimension larger than the inner cross-section of the coil. Consequently, when the anvil is withdrawn from the conical enlargement, it leaves place for formation of the enlarged head.

According to another feature of the invention, the induction-coil means is divided into a plurality (at least one) of angularly separated sections or segments, which may be separatable or at least one of which may be removed to enable the workpiece to be inserted in a lateral direction. For example, the induction-coil means can be constituted from two induction coils each extending over substantially a semi-cylinder and offset from one another by 180°. Of course three angularly spaced induction-coil sections may be provided, each subtending an arc of substantially 120°, at least one of which may be removable. Each of these segments is preferably a completely self-contained coil with terminals across which the electric current is applied and coils which, instead of extending around the workpiece, form loops in cylindrical surface segments whose radius of curvature intersects the axis of the workpiece.

For an especially intensive and uniform heating of the workpiece, especially in the regions of the induction-coil means in which the workpiece is surrounded by a cylindrical coil structure, we prefer to have the individual coil segments constituted in the manner of the stator windings of a shunt-wound rotor electric motor. Of course, the individual induction coils may have turns which overlap in the axial direction to provide the uniform heating of the workpiece.

In order to permit removal and replacement of the workpiece, e.g., when one of the induction-coil segments is not removable, we prefer to provide means for shifting the anvil or upset die laterally, whereupon the workpiece may be drawn axially through the coil.

The present invention also emphasizes a process for the plastic deformation of rod-like metallic workpieces at an induction-heated end thereof, the method comprising heating the anvil and at least an end of the workpiece proximal to the anvil within an induction-coil means simultaneously, relatively displacing the workpiece and the anvil to bring them into forceable contact without cooling of the workpiece prior to engagement with the anvil, whereby the workpiece is upset and spread in contacting the anvil, and withdraws the anvil during the upset deformation of the workpiece from the induction-heating device.

DESCRIPTION OF THE DRAWING

The above and other objects, features and advantages of the present invention will become more readily apparent from the following description, reference being made to the accompanying drawing in which.

SPECIFIC DESCRIPTION

Figure 7:
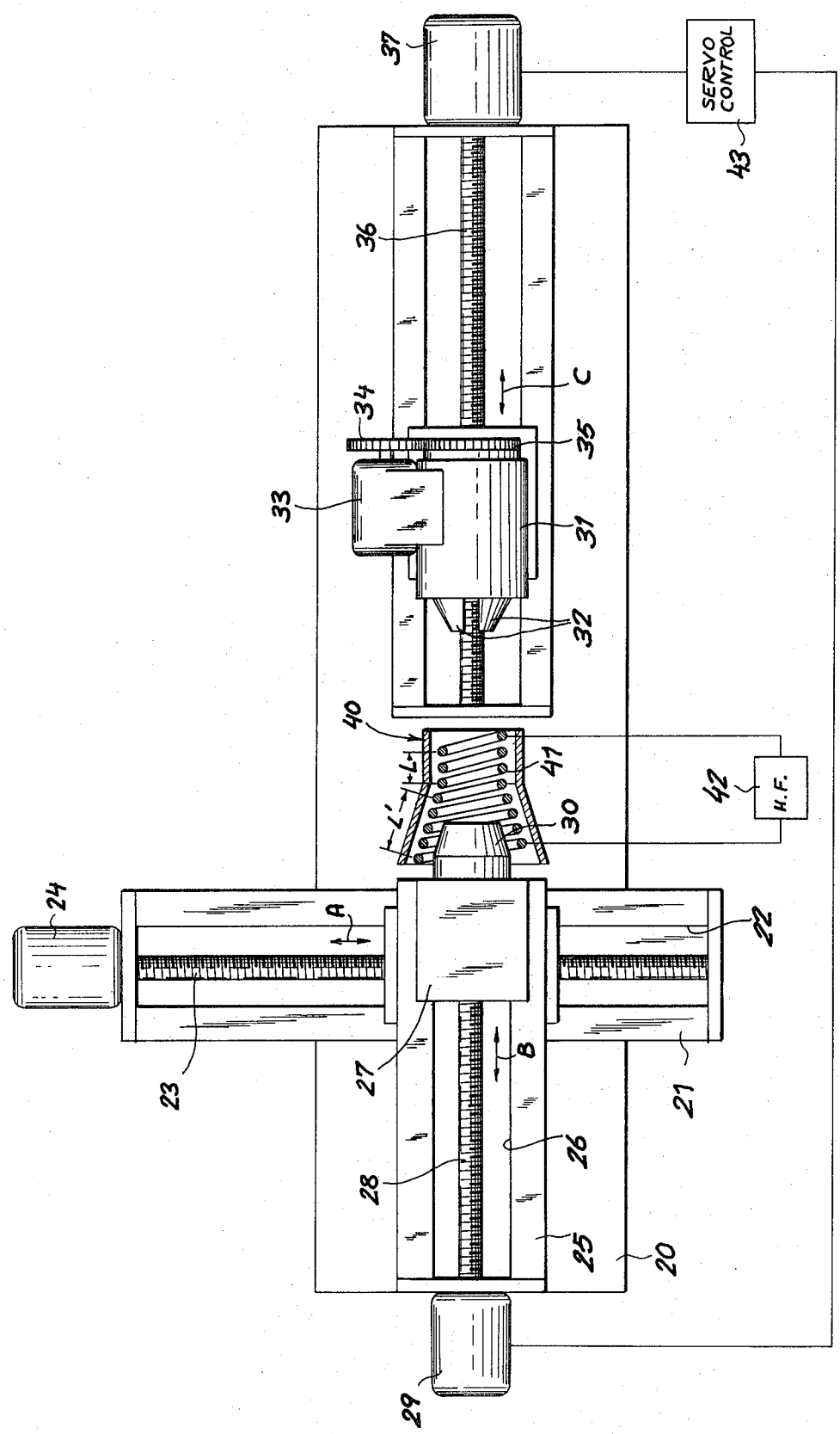
FIG. 7 is a plane view of another apparatus for the upsetting of a metal workpiece.

Referring first to FIG. 7, in which an apparatus for the upsetting of a bar or rod is illustrated somewhat diagrammatically, it can be seen that the upsetting apparatus may comprise a bed 20 upon which a transverse feed table 21 is mounted, with an undercut V-way 22 and a leadscrew 23 driven by the motor 24. On this V-way, the longitudinal bed 25 is shiftable transversely (arros A) by the motor 24 and the leadscrew.

The bed 25 comprises an undercut V-way engaged by the dovetail structure of a head 27 which is shiftable in the longitudinal direction (arros B) by a leadscrew 28 and a motor 29. The head carries the anvil or upsetting die 30.

The rod or bar, not shown, is engageable in a chuck 31, the jaws 32 of which can be tightened by a motor 33 which is coupled to the rotary column of the chuck by a gear assembly 34. The chuck is mounted, in turn, upon a stock 35 displaceable in the longitudinal direction (arros C) by the leadscrew 36 of a motor 37. Between the anvil 30 and the chuck 31, there is provided an induction-heating assembly 40 which can have the configuration of any of those of FIGS. 2 through 6, and which is shown in a simplified manner to include electric coil 41 connected to a high frequency source 42 and transferred by a coolant in accordance with the axial techniques. A stretch L of coil is cylindrical while the remainder L' frustoconically diverges in the direction of the anvil 30 and widens sufficiently to receive this anvil.

Motor 37 and motor 29 are servo-motors or selsyns coupled for rotationed divisional speeds determined by a control 43, so that as the head 30 recedes, the chuck, 31 advances at a greater rate, thereby thrusting the workpiece against the anvil and spreading the heated end thereof. To remove the workpiece, the chuck may be opened, the head 30 shifted in the direction of arrow (a) to one side, and the workpiece axially withdrawn.

In FIGS. 1 through 6, we show an electric upsetting machine with an upsetting mechanism 1, a guide 2 for the workpiece 3, and an anvil 4 against which the workpiece can be shifted axially to spread its heated end in contact with the anvil. These elements are disposed along the workpiece axis in succession.

An electrical heating arrangement is provided in the form of an induction-heating device 5 between the guide 2 and anvil 4. From FIGS. 2 through 6, it will be apparent that the induction-heating device 5 comprises one or more induction coils which, at the side of the arrangement turned toward the guide and feeding device 2 is cylindrical, as represented at 6, and at the side turned toward the anvil is provided with a conical enlargement 7 adapted to receive anvil 4. The workpiece may be fed through the guide and feeding device 2 from right to left in FIGS. 1 and 2.

Figure 1:
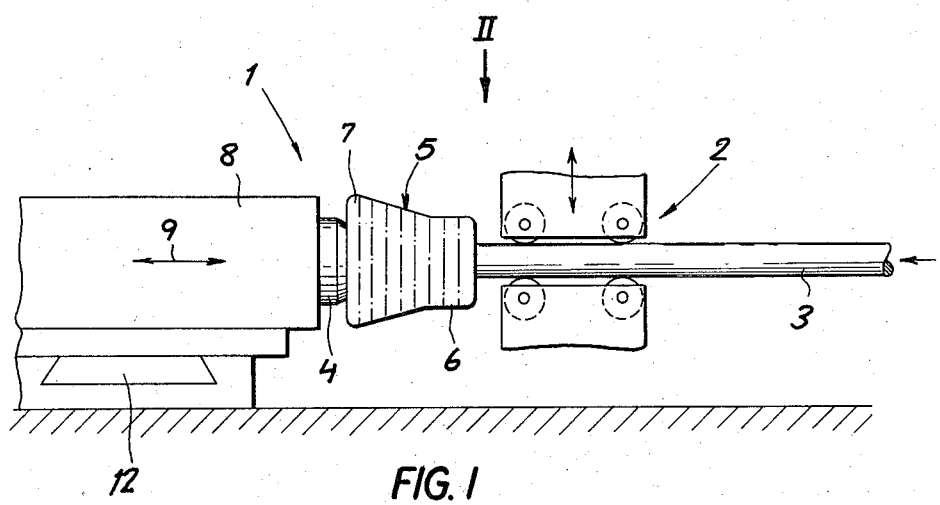
FIG. 1 is a vertical elevational view, partly in section, of an apparatus for carrying out the present invention, seen in diagrammatical form.
Figure 2:
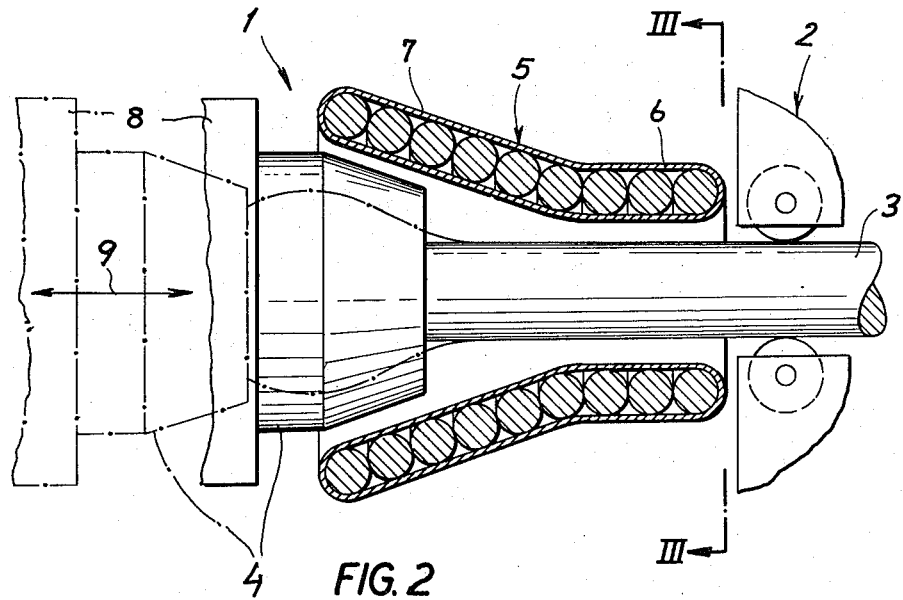
FIG. 2 is a cross-section in the direction of arrow II of FIG. 1, through the induction-heating arrangement thereof.
Figure 3:
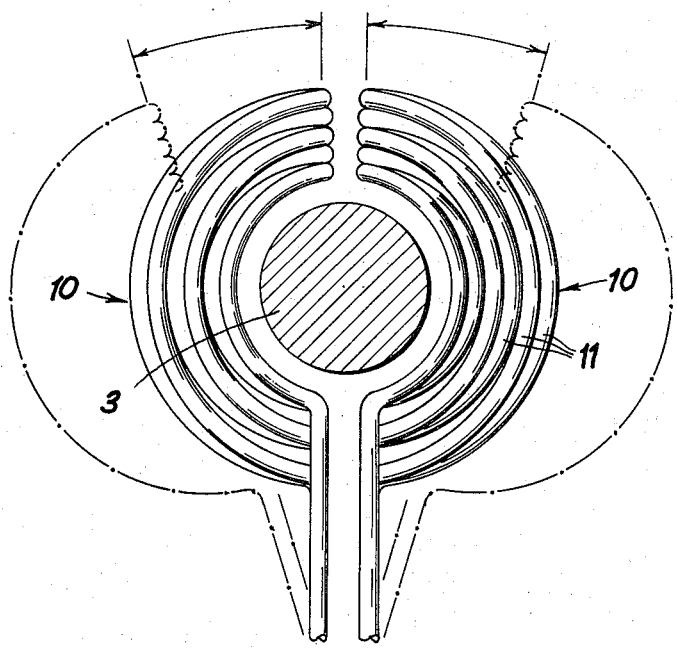
FIG. 3 is a cross-section taken along the line III—III of FIG. 2.

In the embodiment of FIGS. 1 and 2, the induction-coil arrangement is formed with a single coil wound in a generally helical sense. In the embodiment of FIGS. 3 through 6, however, the coil arrangement comprises two or more induction-coils.

The anvil 4 is carried by a positioning drive 8 and can recede from the induction-heating arrangement 5 through 7 as the workpiece advances during the upset deformation. The anvil in all of the embodiments disclosed is composed of inductively heatable material (e.g., metal) or of a material which is not heatable inductively (e.g. ceramic) and cased or coated with metal or some other induction-heatable substance. Prior to the upset deformation, the anvil extends into the induction-heating device 5 and is heated to the same temperature as the workpiece. During the formation, the heated end of the workpiece spreads and the anvil recedes from the induction-coil means, emerging therefrom just as the head formed on the workpiece widens to a cross-section equal to that of the base of the frusto-cone of the induction coil.

Figure 4:
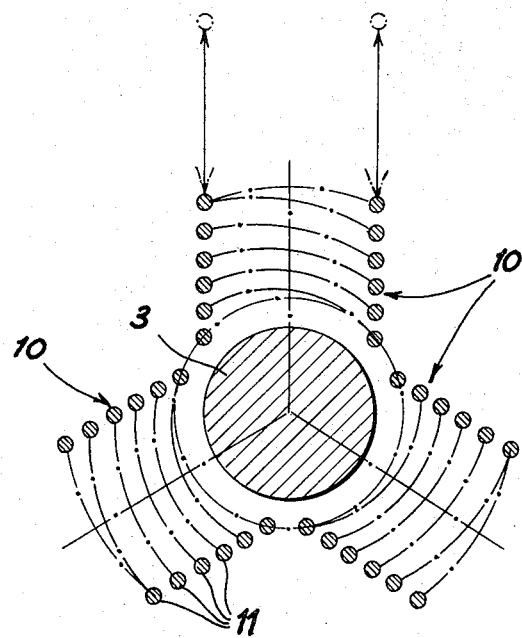
FIG. 4 is a view similar to FIG. 3 but illustrating another embodiment of the invention.
Figure 5:
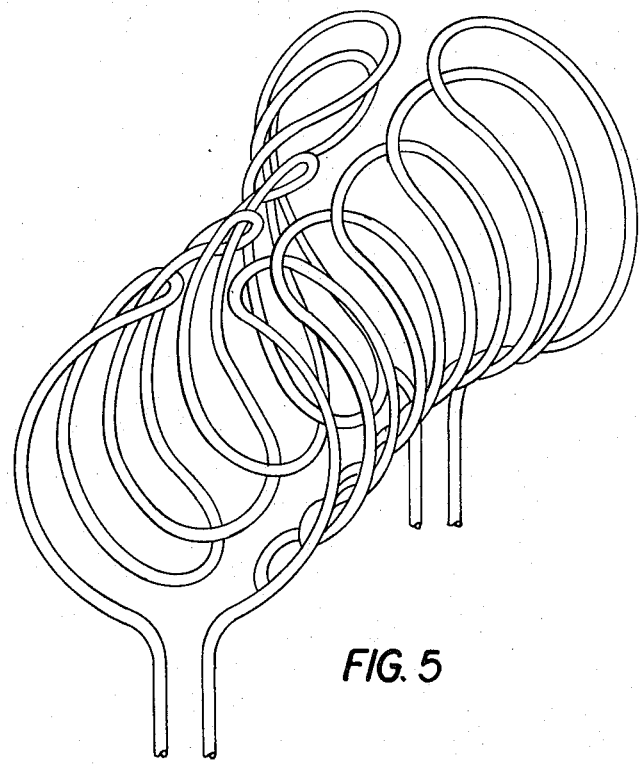
FIG. 5 is a perspective view of an induction-heating arrangement of the type shown in FIG. 3.
Figure 6:
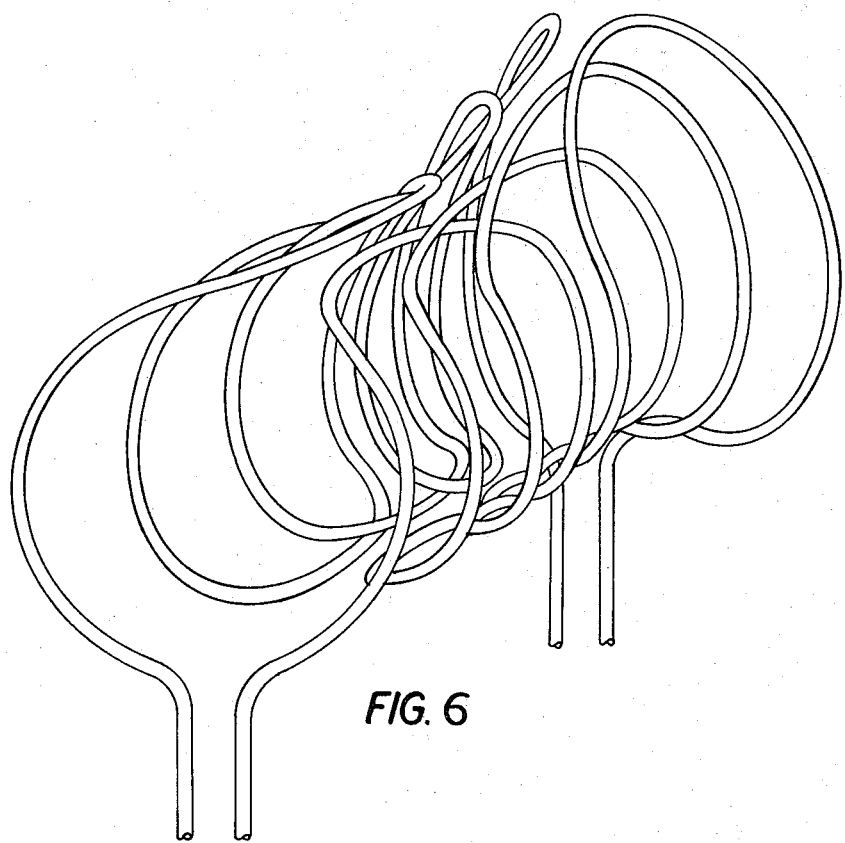
FIG. 6 is a view of still another induction-heating arrangement according to the invention.

From FIGS. 3 through 6 it will be apparent that the induction-coil arrangement can comprise two semicylindrical induction coils (FIGS. 3, 5 and 6), each extending over an arc of 180°, or three sectoral induction coils, each subtending an arc of 120°, as shown in FIG. 4. The individual induction coils 10 are provided with turns 11 and have terminals at their extremities for connection to a high frequency alternating current source. In the embodiment of FIG. 4 the turns are stacked along radii from the workpiece 3 whereas in the embodiments of FIGS. 5 and 6 the turns overlap in the longitudinal direction, each turn surrounding a radius from the workpiece. In general, the individual induction coils can be wound as the coils of a stator of an electric motor of the shunt-wound rotor type and can be similarly connected in the electrical circuit. FIGS. 5 and 6 show that single or double overlaps can be provided for the turns of the coil. A dovetail arrangement 12 may be provided for the anvil to permit it to be shifted laterally as described in connection with FIG. 7.

We claim:

1. An electrical upsetting device for an elongated metallic workpiece, comprising an anvil; means for positioning a workpiece in axial alignment with said anvil; an induction-heating coil arrangement surrounding said workpiece ahead of the last mentioned means in the direction of said anvil, said arrangement comprising a generally cylindrical portion surrounding said workpiece remote from said anvil and a frustoconical portion diverging toward and receiving said anvil; and means for axially shifting said workpiece into engagement with said anvil and for withdrawing said anvil from said conical portion.

2. The device defined in claim 1 wherein said anvil is composed at least in part of inductively heatable material and is heated simultaneously with said workpiece.

3. The device defined in claim 2 wherein said coil arrangement comprises at least two induction-coils each extending over an arc of said workpiece, at least one of said coils being removable to permit lateral insertion of said workpiece into said coil arrangement.

4. The device defined in claim 3 wherein two such coils are provided and each of said coils extends over an arc of substantially 180° about said workpiece.

5. The device defined in claim 3 wherein three such coils are provided, each of said coils subtending an arc of substantially 120° about said workpiece.

6. The device defined in claim 3 wherein each of said coils has a plurality of turns in overlapping relationship in the axial direction of said workpiece.

7. The device defined in claim 1, further comprising means for shifting said anvil laterally of said workpiece or enabling said workpiece to be inserted into and withdrawn from said coil arrangement in an axial direction.

8. An electric upsetting device for an elongated workpiece, comprising an anvil; workpiece-feed means axially spaced from said anvil for advancing said workpiece in the direction thereof; and an induction-heating coil arrangement between said workpiece feed means and said anvil, said coil arrangement comprising at least two individual induction-coils each subtending at least 120° of arc around a workpiece disposed between said anvil and said feed means, each of said coils being provided with a plurality of turns overlapping in the axial direction.

9. The device defined in claim 8 wherein the individual coils are provided with windings of the type used in stators of shunt-wound rotor electrical motors.

10. The device defined in claim 8 wherein two such coils are provided and each of said coils subtends an arc of substantially 180°.

11. The device defined in claim 8 wherein three such coils are provided and each of said coils subtends an arc of substantially 120°.

12. The device defined in claim 8 wherein said coil arrangement widens away from said feed means, said anvil being receivable within said coil arrangement and being composed at least in part of inductively heatable material.

13. An electric upsetting device for an elongated workpiece comprising an anvil composed at least in part of inductively heatable material; workpiece-feed means axially spaced from said anvil for advancing said workpiece in the direction thereof; and an induction heating coil surrounding said workpiece and at least partly enclosing said anvil for jointly heating said workpiece and said anvil upon energization of said coil.

* * * * *